United States Patent
Nobutoki et al.

[11] Patent Number: 5,263,022
[45] Date of Patent: Nov. 16, 1993

[54] MULTIPLEX TRANSMISSION METHOD

[75] Inventors: Yoshikazu Nobutoki, Higashihiroshima; Masao Hideshima, Hiroshima; Shigeyuki Satomura, Kure; Akira Sone, Hiroshima, all of Japan

[73] Assignee: Mazda Motor Corporation, Hiroshima, Japan

[21] Appl. No.: 858,537

[22] Filed: Mar. 27, 1992

[30] Foreign Application Priority Data

Mar. 29, 1991 [JP] Japan .................. 3-066244

[51] Int. Cl.$^5$ .............................................. H04J 3/12
[52] U.S. Cl. ............................ 370/85.8; 340/825.08
[58] Field of Search .................. 178/4.1 B, 4.1 C; 340/502, 503, 504, 870.42, 825.08, 825.15, 825.54; 370/77, 85.8, 95.2

[56] References Cited

U.S. PATENT DOCUMENTS

| 3,778,540 | 12/1973 | Fretwell | 178/4.1 B |
| 4,360,912 | 11/1982 | Metz et al. | 370/85.8 |
| 4,466,001 | 8/1984 | Moore et al. | 370/95.2 |
| 4,872,003 | 10/1989 | Yoshida | 340/825.08 |
| 5,157,658 | 10/1992 | Arai et al. | 370/85.11 |

FOREIGN PATENT DOCUMENTS 61-224534 10/1986 Japan .

Primary Examiner—Benedict V. Safourek

[57] ABSTRACT

In a multiplex transmission method of a multiplex transmission apparatus provides time-divisional multiplex transmission operations among a plurality of communication nodes. A among the plurality of communication nodes predetermined node among the plurality of communication nodes is started requests other communication nodes to transmit connection signals so as to confirm a connection state of communication nodes on the multiplex transmission bus. When the predetermined communication node receives the connection signals from the other nodes within a predetermined period of time, confirmation of the connection state is ended and a multiplex transmission of data is started.

6 Claims, 8 Drawing Sheets

MULTIPLEX TRANSMISSION METHOD

BACKGROUND OF THE INVENTION

The present invention relates to a multiplex transmission method used in, e.g., a vehicle and, more particularly, to a multiplex transmission method for confirming communication nodes connected to a transmission path at the beginning of multiplex transmission.

In recent vehicles, the number of electronic devices equipped in a vehicle is considerably increased along with the development of electronic control, and this results in an increase in the number of wiring lines for connecting the electronic devices, and a complicated wiring structure. In order to solve these problems, as disclosed in, e.g., Japanese Laid-Open Patent Application No. 61-224534, a multiplex transmission method has been examined, and is beginning to be put into practical applications. In this method, signal transmission operations among a plurality of electronic devices are performed in a multiplex transmission mode, i.e., communication nodes of the plurality of electronic devices are connected to a common transmission path, and signal transmission operations among the communication nodes are performed in the multiplex transmission mode.

As a multiplex transmission system for a vehicle, a system, in which communication nodes of various drive controllers such as an EGI controller, a 4WS controller, an ABS/TRC controller, and the like, are connected, and control information is multiplex-transmitted among these nodes, may be proposed. In this case, the types of drive controllers mounted in vehicles are not always the same, and in multiplex transmission apparatuses for vehicles, the types of connected nodes (connection nodes) are not always the same. For example, the types of drive controllers and connection nodes are different depending on destination countries for the vehicles, such as the U.S.A, EC, Australia, and the like, and are also different depending on grades or options of vehicles even if the vehicles are delivered for the same destination country.

When multiplex transmission is performed, a multiplex transmission apparatus itself must recognize a node connection state of a transmission path (the types of nodes connected to the transmission path). As a method of recognizing the node connection state, the following method of checking the types of connection nodes by the multiplex transmission apparatus itself at the beginning of multiplex transmission may be proposed.

More specifically, the following method may be proposed. That is, a predetermined communication node stores in advance information indicating all the nodes which may be connected in communication involving all the multiplex transmission apparatuses (all the nodes will be referred to as "overall maximum connection nodes" hereinafter, and information indicating the "overall maximum connection nodes" will be referred to as "overall maximum connection node information" hereinafter). At the same time, a predetermined time period (a time long enough for the "overall maximum connection nodes" to transmit the following connection signals) is set. The predetermined communication node requests other nodes to transmit connection signals indicating connections of these nodes, and confirms connection nodes on the basis of the connection signals received within the predetermined time period after the request.

More specifically, the predetermined communication node confirms connections between itself and the nodes, which transmitted the connection signals. If the predetermined communication node receives connection signals from nodes except for itself of the overall maximum connection nodes within the predetermined time period, it determines at that time without waiting an elapse of the predetermined time period that the overall maximum connection nodes are connected, and ends the confirmation of connection nodes.

In the multiplex transmission, it is often required that confirmation of connection nodes performed at the beginning of multiplex transmission be quickly ended, and a multiplex transmission control state for actually performing multiplex transmission be started quickly.

The above-mentioned confirmation method basically requires a considerably long predetermined time period, which is set to be long enough for all of the overall maximum connection nodes to send back signals. In addition, when it can be confirmed within the predetermined time period that all of the overall maximum connection nodes are connected, the confirmation operation is ended at that time. However, the number of actually connected nodes is often smaller than the number of overall maximum connection nodes, and this method cannot always end confirmation within a short period of time.

SUMMARY OF THE INVENTION

The present invention has been made in consideration of the above situation, and has as its object to provide a multiplex transmission method, which can shorten the confirmation time of connection nodes by a multiplex transmission apparatus itself, and can quickly start a multiplex transmission control state.

In order to achieve the above object, according to the present invention, there is provided a multiplex transmission method in a multiplex transmission apparatus for performing time-divisionally distributed multiplex transmission operations among a plurality of communication nodes, comprising the steps of: judging, when the multiplex transmission apparatuses are grouped into a plurality of groups, the presence/absence of information indicating all the communication nodes, which may be connected to a multiplex transmission apparatus belonging to a given group; storing, when the information is present, the information in a predetermined one of the plurality of communication nodes; causing the predetermined communication node to request other communication nodes to transmit connection signals indicating that other communication nodes are connected to the multiplex transmission apparatus; and confirming the communication nodes connected to the multiplex transmission apparatus on the basis of the connection signals received within a predetermined period of time after the request is issued.

Preferably, when it is confirmed based on the confirmation result that all the communication nodes, which may be connected to the multiplex transmission apparatus belonging to a given group, are connected, confirmation of the connected communication nodes is ended at that time.

Preferably, when it is confirmed based on the confirmation result that communication nodes, which may be connected to the multiplex transmission apparatus belonging to a given group, are connected, the predetermined communication node informs the connection state to other communication nodes.

Other features and advantages of the present invention will be apparent from the following description taken in conjunction with the accompanying drawings, in which like reference characters designate the same or similar parts throughout the FIGURES thereof.

DETAILED DESCRIPTION OF THE PREFERRED EMBODIMENT

The preferred embodiment of the present invention will now be described with reference to the accompanying drawings. The embodiment to be described below employs a network access method called a CSMA/CD-AMP system, as a multiplex transmission method for a vehicle. The CSMA (Carrier Sense Multiple Access) means a system wherein each communication node confirms a ready state of a transmission path upon generation of a transmission request, and performs transmission, and the CD (Collision Detection) means a system wherein each communication node monitors transmission signals on a transmission path, and performs re-transmission control upon detection of collision of signals. The AMP (Arbitration on Message Priority) means a system wherein a message having a high priority is transmitted without being destroyed upon collision of signals.

Multiplex Transmission Apparatus

Figure 1:
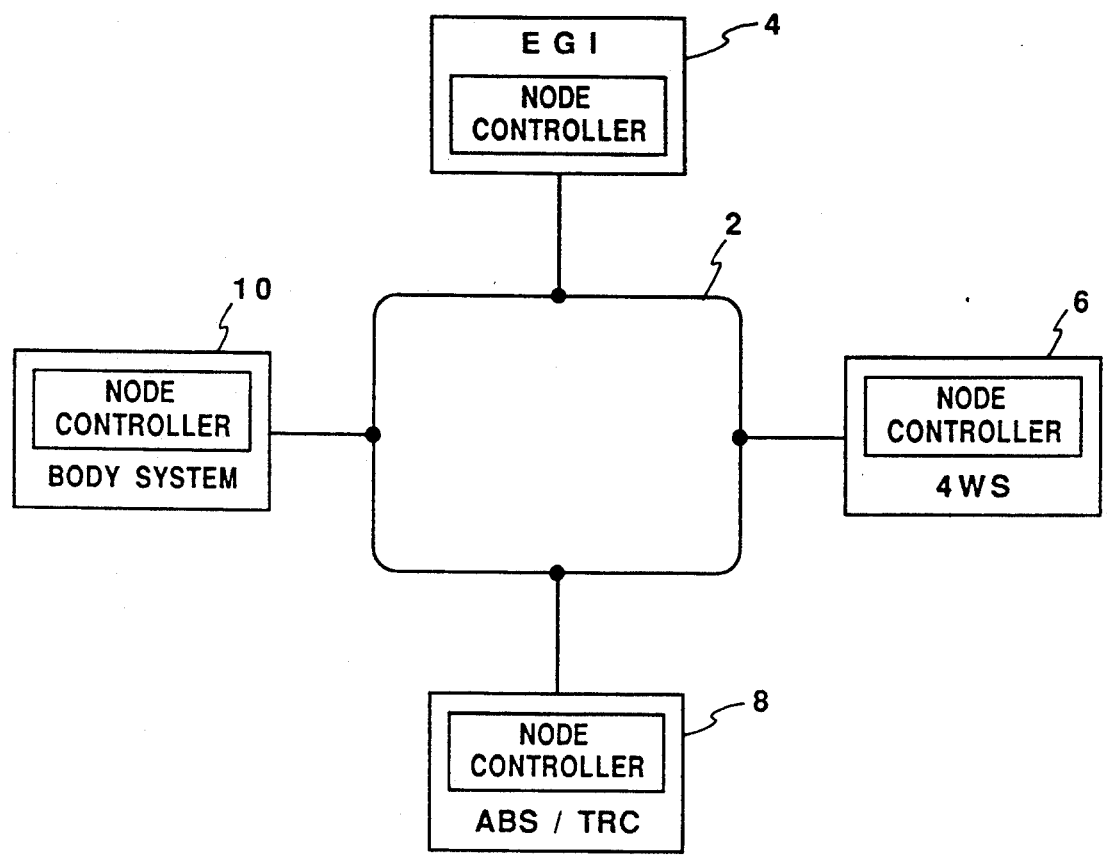
FIG. 1 is a schematic block diagram showing an arrangement of a multiplex transmission apparatus according to an embodiment of the present invention.

FIG. 1 is a schematic block diagram showing the arrangement of a multiplex transmission apparatus according to this embodiment. The apparatus shown in FIG. 1 has a common transmission path (bus) 2 comprising loop-like twisted pair lines. The transmission path 2 is connected to four multiplex communication nodes. The four communication nodes include an EGI node 4 having an EGI controller for performing engine control, a 4WS node having a 4WS controller for performing four-wheel steering control, an ABS/TRC node 8 having an ABS/TRC controller for performing slip control of wheels, and a body-system node 10 having a controller for controlling switches associated with a body.

Signal transmission operations among the communication nodes 4, 6, 8, and 10 are performed via the transmission path 2 in a multiplex transmission mode based on a time-divisional distributed control system, and the above-mentioned CSMA/CD-AMP system. A signal transmitted from one node is received by all the remaining nodes.

Signal Frame

Figure 2:
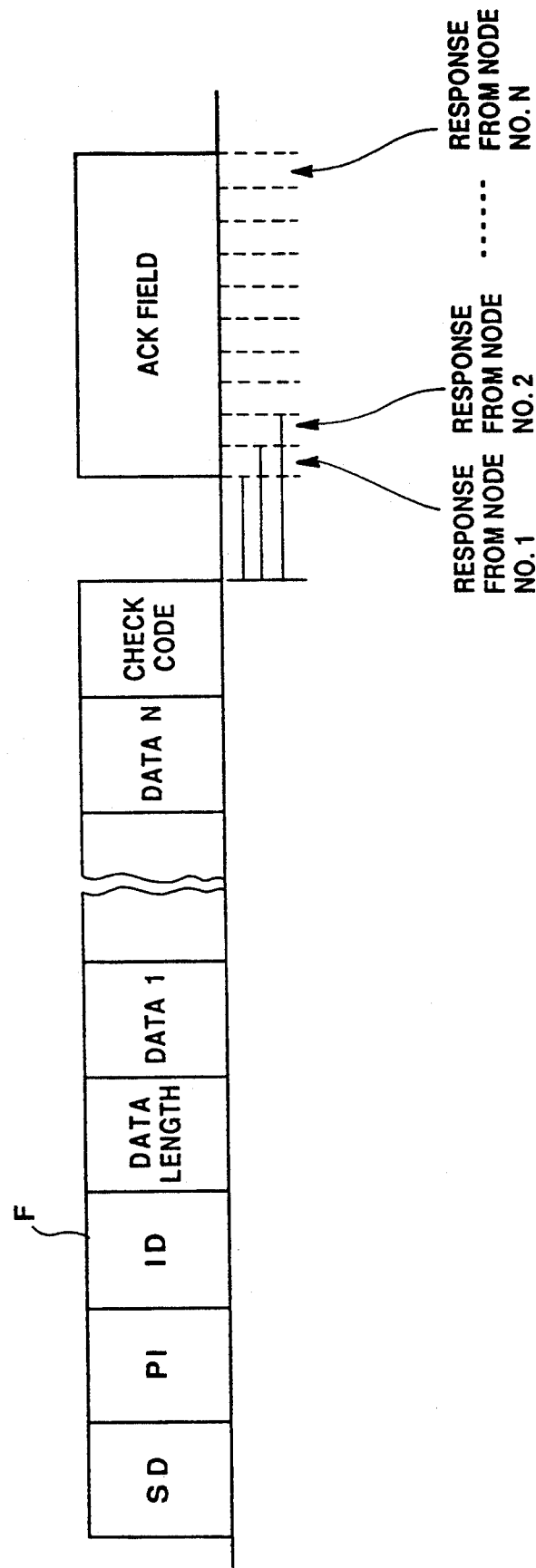
FIG. 2 is a view showing a signal frame.

In the above-mentioned signal transmission operation, each of the communication nodes 4, 6, 8, and 10 transmits information of its own node, e.g., various pieces of vehicle drive information or control information using a signal frame F having a format shown in FIG. 2 in units of frames, and the remaining nodes receive the frame F. The frame F has an SD code, a PI code, an ID code, a data length, data 1 to data N, and a check code.

The "SD (Start Delimiter) code" is a specific code representing the start of the frame F. Upon reception of the SD code, each node can recognize the start of the frame F. The "PI (priority) code" is a code indicating a priority order for instructing a signal to be preferentially processed when a plurality of communication nodes simultaneously transmit data, and signals collide with each other. In this embodiment, a lower bit value indicates a higher priority. This is because a low level corresponds to WIRED-OR in the transmission path 2.

If signals are simultaneously transmitted from a plurality of nodes, the "PI code" of a node having a high priority remains on the transmission path 2. For this reason, a node having a low priority detects collision since its own "PI code" is replaced with another code, and re-transmits its own unsuccessful frame.

The "ID (frame ID) code" is a code indicating a transmission source of the corresponding frame. The "data length" is written with the number of following data. For example, if N data follow, N is sent as the data length. A node, which received the frame F, reads the data content by only the data length. The "data 1 to data N" are written with various pieces of information to be transmitted in the frame F.

A field following the data is the "check code" (CRC check code; error detection code). Upon reception of this code, a node can detect the end of the frame.

ACK Field

When each communication node transmits the signal frame F, it sends an "ACK field (reception acknowledge signal field)" onto the transmission path 2. This field consists of bits (4 bits since the four communication nodes are connected in this embodiment) corresponding in number to communication nodes connected to the transmission path 2, and a predetermined inherent bit region is assigned to each communication node. Each communication node acknowledges normal reception of the frame F using the corresponding bit region of the ACK field. More specifically, a communication node (transmission node), which transmits the signal frame, sets "0" in the corresponding bit region of the ACK field upon transmission of the signal frame, and sends it onto the transmission path after the signal frame.

On the other hand, a communication node (reception node), which receives this signal frame, checks if the contents of the data 1 to N in the received frame include an error. If no error is found, the reception node sets "1" in the corresponding inherent bit region, and transmits it as a reception acknowledge signal (ACK signal). In this case, the transmission node receives the ACK signal simultaneously with transmission of the signal frame F, and if it can normally receive the signal frame, it sets "1" in the bit region in the ACK field inherent to the transmission node.

Therefore, when the communication nodes normally receive the transmitted signal frame, all the bit regions of the ACK field on the transmission path 2 are set with "1". If any of the reception nodes cannot normally receive the signal frame, the bit region inherent to this reception node remains to be "0". Therefore, the transmission node receives this ACK field to check if the reception nodes normally received the signal frame, and if the transmission node determines that any of the reception nodes has not received the signal frame, it retransmits the same signal frame.

Grouping of Apparatuses

A grouping operation for grouping multiplex transmission apparatuses into a plurality of groups will be described below. For example, in the case of multiplex transmission apparatuses mounted on vehicles, when multiplex transmission apparatuses mounted on all the types of vehicles are assumed to be overall multiplex transmission apparatuses, these apparatuses can be grouped in units of destination countries of vehicles, or can be grouped in units of types of vehicles. Of course, the apparatuses may be grouped based on other criterions.

Information indicating all the communication nodes, which may be connected to a multiplex transmission apparatus belonging to each of the plurality of groups will be referred to as grouped maximum connection node information hereinafter. For example, when the apparatuses are grouped in units of destination countries of vehicles, as described above, the grouped maximum connection node information means maximum connection node information in units of destination countries, i.e., information indicating all the types of communication nodes which may be connected to a multiplex transmission apparatus belonging to a given destination country group.

A case will be examined below wherein multiplex transmission apparatuses mounted on vehicles are grouped in units of destination countries. For example, when a maximum of five types of communication nodes may be connected for vehicles of all the destination country groups, a maximum of five types of communication nodes may be connected in a group of a destination country A, a maximum of four types of communication nodes may be connected in a group of a destination country B, and a maximum of three types of communication nodes may be connected in a group of a destination country C.

Thus, in the case of a multiplex transmission apparatus of the group B, if the overall maximum connection node information is used as maximum connection node information, the overall maximum connection nodes include five types of nodes. However, in practice, a maximum of four types of communication nodes can only be connected to the multiplex transmission apparatus of the group B, and, after all, it cannot be confirmed that the overall maximum connection nodes are connected. As a result, confirmation of connection nodes requires the predetermined time period.

In contrast to this, when the grouped maximum connection node information is stored, all the grouped maximum connection nodes are often connected to a multiplex transmission apparatus of a given group. In this case, it can be confirmed based on the sent-back connection signal before an elapse of the predetermined time period that all the grouped maximum connection nodes are connected, and the connection node confirmation time can be shortened.

As the predetermined time period, a time long enough for grouped maximum connection nodes to send back signals can be set in place of a time long enough for all the overall maximum connection nodes to send back signals. Even when the grouped maximum connection nodes are not all connected, the connection node confirmation time can be shortened since the predetermined time period to be set is shortened.

Confirmation of Connection Nodes

In the multiplex transmission, the types of communication nodes connected to the transmission path 2 are confirmed at the beginning of multiplex transmission. After the end of confirmation, a multiplex transmission control state is set to start the actual multiplex transmission. The confirmation of connection nodes will be described below with reference to FIG. 3.

In this embodiment, destination country information is stored as the above-mentioned grouped maximum connection node information in the EGI node 4 as a predetermined communication node. The EGI node is selected as the predetermined communication node since it has a high possibility of connection to any type of multiplex transmission apparatus. The destination country information indicates a total of five nodes as grouped maximum connection nodes, i.e., the EGI node 4, the 4WS node 6, the ABS/TRC node 8, and the body-system node 10, which are actually connected, and another communication node in addition to the above-mentioned nodes. As a predetermined time period $t_1$, 65 ms are set as a time long enough for these five nodes, which may be connected, to transmit connection signals. Note that the overall maximum connection nodes in this multiplex transmission apparatus include a total of six types of nodes, i.e., the above-mentioned nodes 4, 6, 8, and 10, and two types of extra nodes.

When an engine speed reaches 500 rpm, the EGI node 4 transmits a fail frame transmission request frame F1. A fail frame is a connection signal, i.e., a signal frame for informing that the self node is connected. The fail frame transmission request frame F1 is a signal frame for requesting connected nodes to transmit the fail frames.

Figure 3:
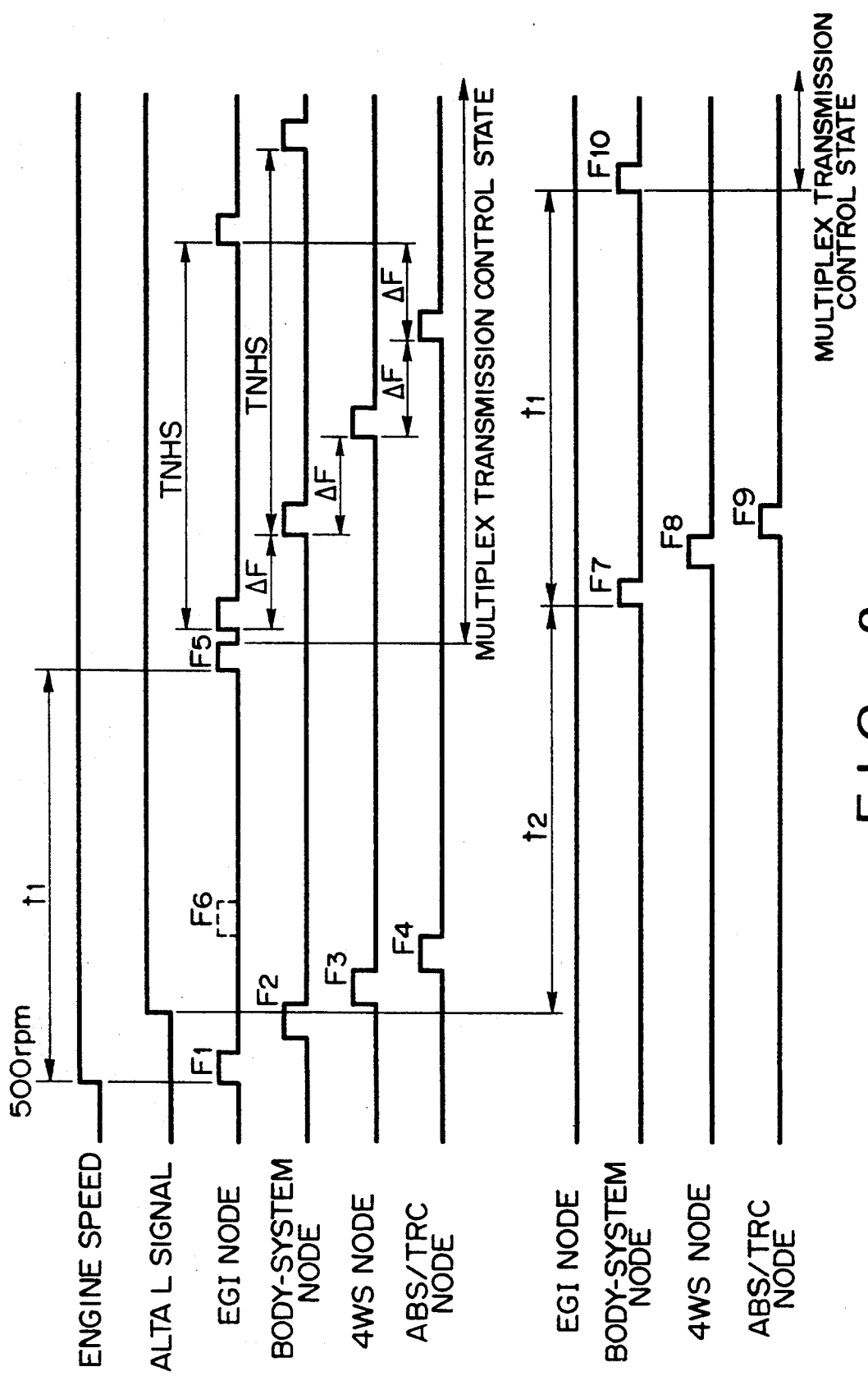
FIG. 3 is a timing chart showing a connection node confirmation procedure.

When the fail frame transmission request frame F1 is transmitted, the body-system node 10, the 4WS node 6, and the ABS/TRC node 8 connected to the transmission path 2 sequentially transmit fail frames F2, F3, and F4 in response to the frame F1, as shown in FIG. 3. The EGI node 4 receives these fail frames F2, F3, and F4, and recognizes based on the fail frames F2, F3, and F4 that the body-system node 10, the 4WS node 6, and the ABS/TRC node 8 are connected, and verifies these nodes with the stored grouped maximum connection nodes. When the fail frames are not received from all the grouped maximum connection nodes (excluding the EGI node), the EGI node waits for transmission of a fail frame until the predetermined time period $t_1$ elapses.

After the elapse of the predetermined time period $t_1$, the EGI node determines that the remaining one node, which did not transmit a fail frame, is in a down state, and confirms that the connected nodes are the body-system node 10, the 4WS node 6, and the ABS/TRC node 8, from which the fail frames F2, F3, and F4 are received, and the EGI node 4 as the self node. The self node sets a node connection state representing that the connected nodes are these nodes 4, 6, 8, and 10, and transmits an ANC reference data frame F5 as a signal frame for informing the node connection state, thereby authorizing the node connection state to the respective nodes.

After the ANC reference data frame F5 is transmitted, a multiplex transmission control state is set, and multiplex transmission operations among the nodes are actually started. In the multiplex transmission of this embodiment, as shown in FIG. 3, each node performs so-called refresh transmission operations for transmitting a signal frame for informing its own information at a predetermined transmission period TNHS, and also performs an event transmission operation for, when its own information changes, informing the changed information, as needed, although not shown.

In the above-mentioned case, if the destination country information indicates that the grouped maximum connection nodes are the EGI node 4, the body-system node 10, the 4WS node 6, and the ABS/TRC node 8, it is confirmed upon reception of the fail frames F2, F3, and F4 from the nodes 10, 6, and 8 that all the grouped maximum connection nodes are connected. At that time, confirmation of connection nodes is ended, and the self nodes sets a node connection state representing that the connected nodes are these nodes 4, 6, 8, and 10. In addition, as indicated by a dotted line in FIG. 3, the self node transmits the ANC reference data frame F6 for informing the node connection state, and then starts a multiplex transmission control state.

If the EGI node 4 is in a down state, no fail frame transmission request frame F1 is transmitted. In this case, a predetermined node other than the EGI node 4 confirms connection nodes.

More specifically, assume that the body-system node 10 is set as a predetermined node other than the EGI node 4. When no fail frame transmission request frame F1 is transmitted from the EGI node from the time when an alter L signal goes to high level until a predetermined time period $t_2$ (e.g., 500 ms) elapses, the body-system node 10 determines that there is no possibility that the frame F1 is transmitted from the EGI node 4. After the elapse of 500 ms, the node 10 transmits a fail frame transmission request frame F7, and then waits for the predetermined time period $t_1$. The node 10 confirms based on fail frames F8 and F9 received until the predetermined time period $t_1$ elapses that the 4WS node 6, the ABS/TRC node 8, and the body-system node 10 as the self node are connection nodes. The self node 10 sets a node connection state indicating that the connection nodes are these nodes 6, 8, and 10, and transmits an ANC reference data frame F10 for informing the node connection state, thus starting a multiplex transmission control state.

If both the EGI node 4 and the body-system node 10 are in a down state, no confirmation of connection node is performed, and a multiplex transmission control state is not started.

As described above, at the beginning of multiplex transmission, the EGI node or the body-system node serves as a master node to manage a node connection state according to a concentrated system, and after a multiplex transmission control state is started, each node manages the node connection state according to an independent distributed system. For example, if the down EGI node 4 is recovered to a normal state during multiplex transmission control, the EGI node 4 transmits a normal recovery frame, and other nodes set a node connection state including the EGI node 4 upon reception of the frame.

Description of Flow Charts

The connection node confirmation procedure will be described in detail below with reference to the flow charts shown in FIGS. 4 and 5.

Figure 4:
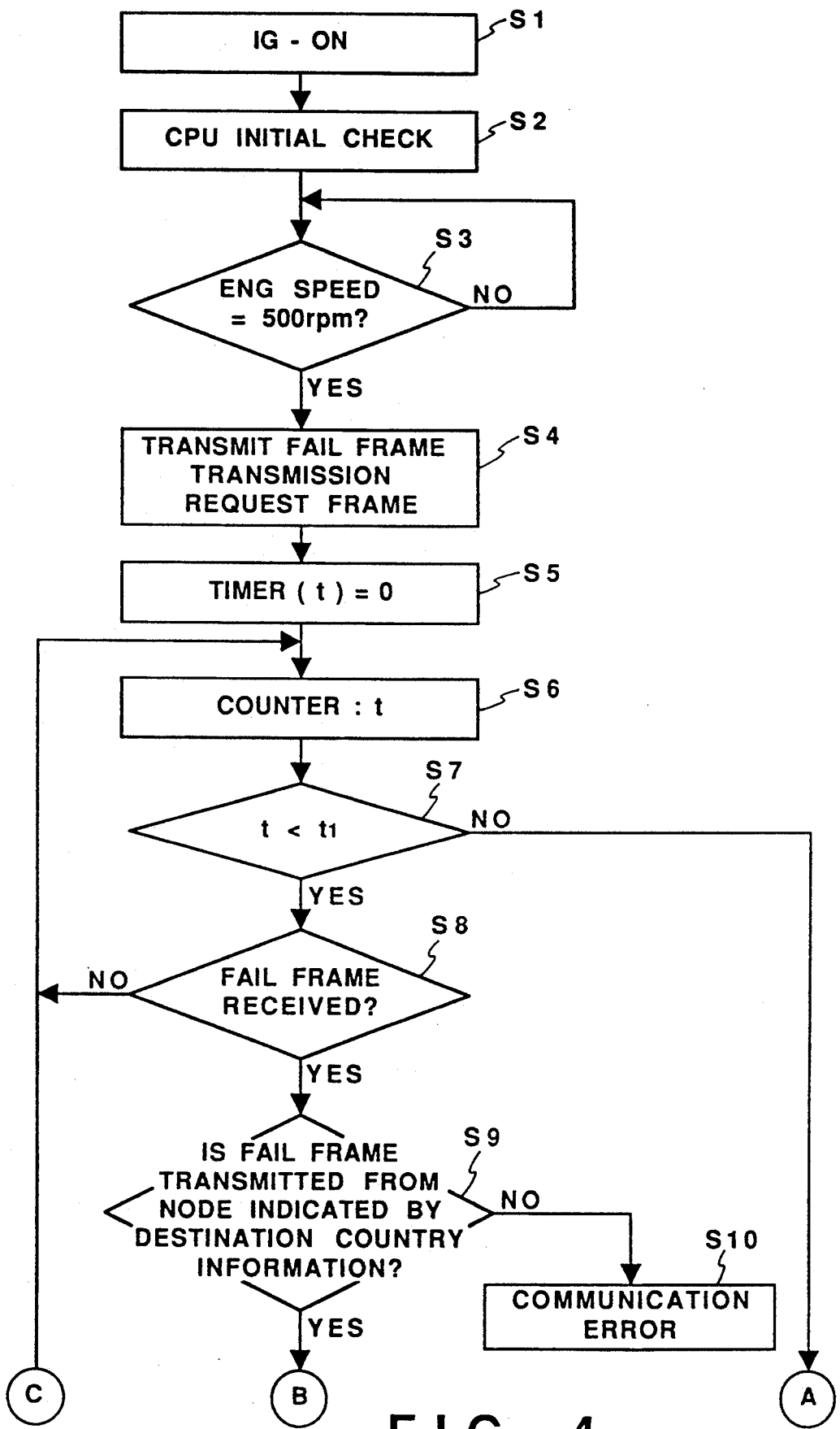
FIGS. 4 and 5 are flow charts showing a connection node confirmation procedure in an EGI node.
Figure 5:
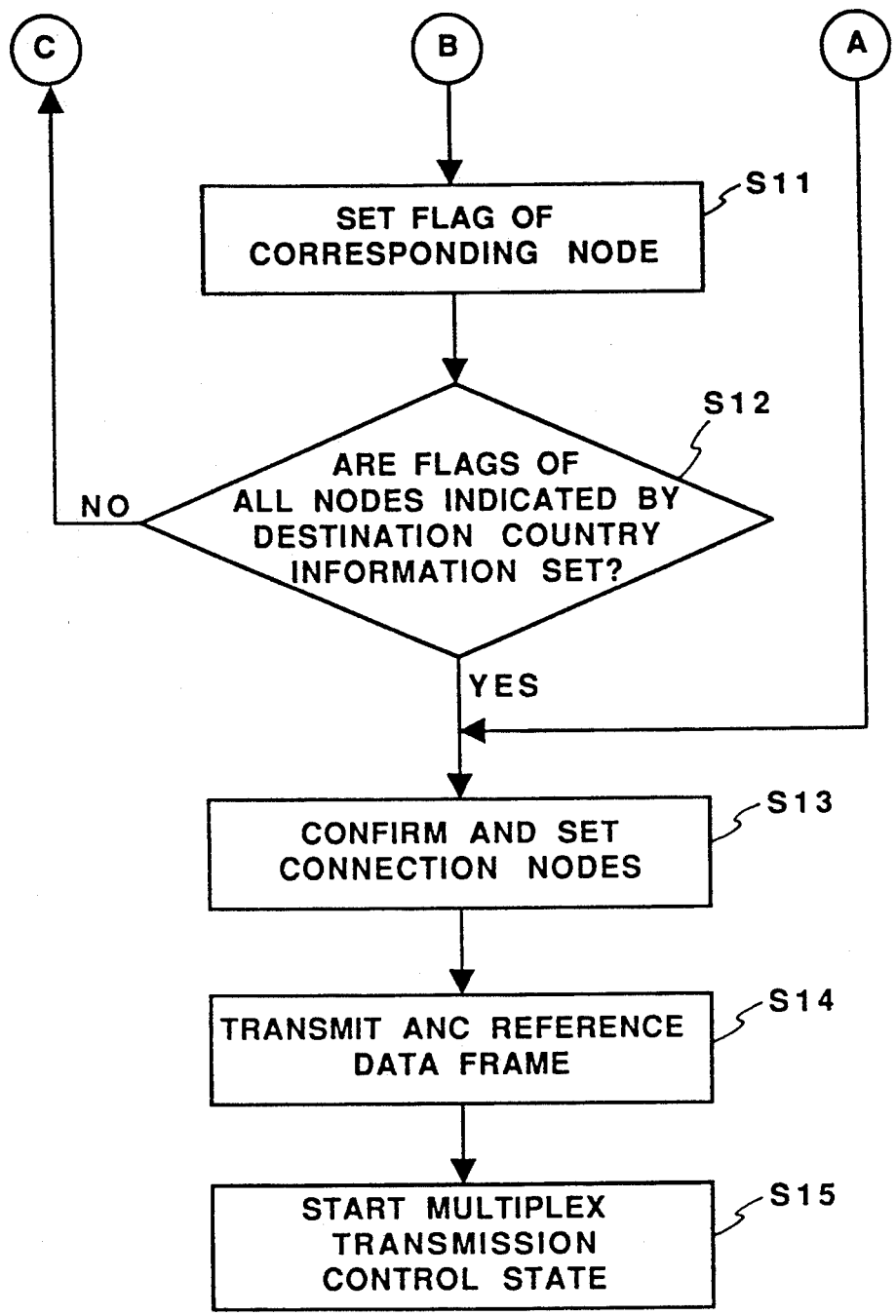

FIGS. 4 and 5 are flow charts showing the connection node confirmation procedure of the EGI node. If an IG-ON (ignition ON) state is detected in step S1, a CPU initial check operation of the EGI node is performed in step S2. It is checked in step S3 if an engine speed has reached 500 rpm. If NO in step S3, the control waits until the engine speed reaches 500 rpm. If YES in step S3, a fail frame transmission request frame is transmitted in step S4. In step S5, a timer (t) is reset to zero. In step S6, the count operation of t is started.

It is checked in step S7 if the count t is less than the predetermined time period $t_1$. If YES in step S7, it is checked in step S8 if a fail frame is received. If NO in step S8, the flow returns to step S6; otherwise, it is checked in step S9 if the received fail frame is transmitted from one of the communication nodes (grouped maximum connection nodes) indicated by destination country information. If NO in step S9, a communication error is determined in step S10. However, if YES in step S9, a flag corresponding to the communication node is set in step S11 in FIG. 5. In step S12, it is checked if flags corresponding to all the nodes (excluding the EGI node) indicated by the destination country information are set. If NO in step S12, the flow returns to step S6. If YES in step S12, the flow advances from step S12 to step S13. In step S13, the EGI node confirms that connection nodes are all the nodes indicated by the destination country information, and sets a node connection state.

If any of the nodes indicated by the destination country information is not connected, a loop consisting of steps S6, S7, S8, S9, S11, and S12 is repeated. When the count t reaches $t_1$, it is determined that a node, from which no fail frame is sent back, of the nodes (excluding the EGI node) indicated by the destination country information is in a down state (even if this node is not connected in practice, it is determined that the node is in a down state). The flow then advances from step S7 to step S13. In step S13, it is confirmed that the transmission source nodes of the fail frames received until $t = t_1$, and the EGI node are connected, and a node connection state is set.

After the connection nodes are confirmed and set in step S13, the above-mentioned ANC reference data frame is transmitted in step S14, and a multiplex transmission control state is started in step S15.

Figure 6:
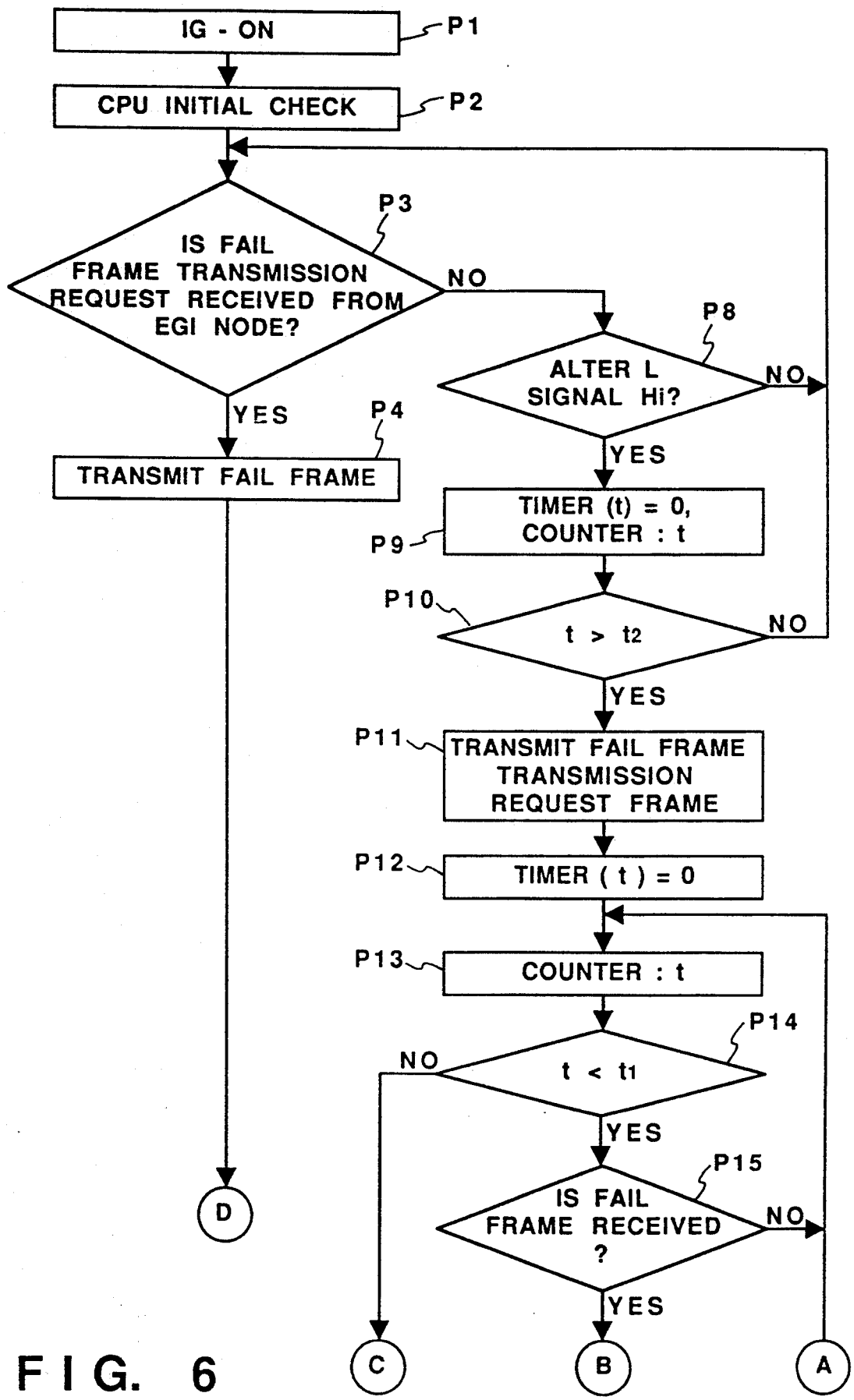
FIGS. 6 and 7 are flow charts showing a connection node confirmation procedure in a body-system node.
Figure 7:
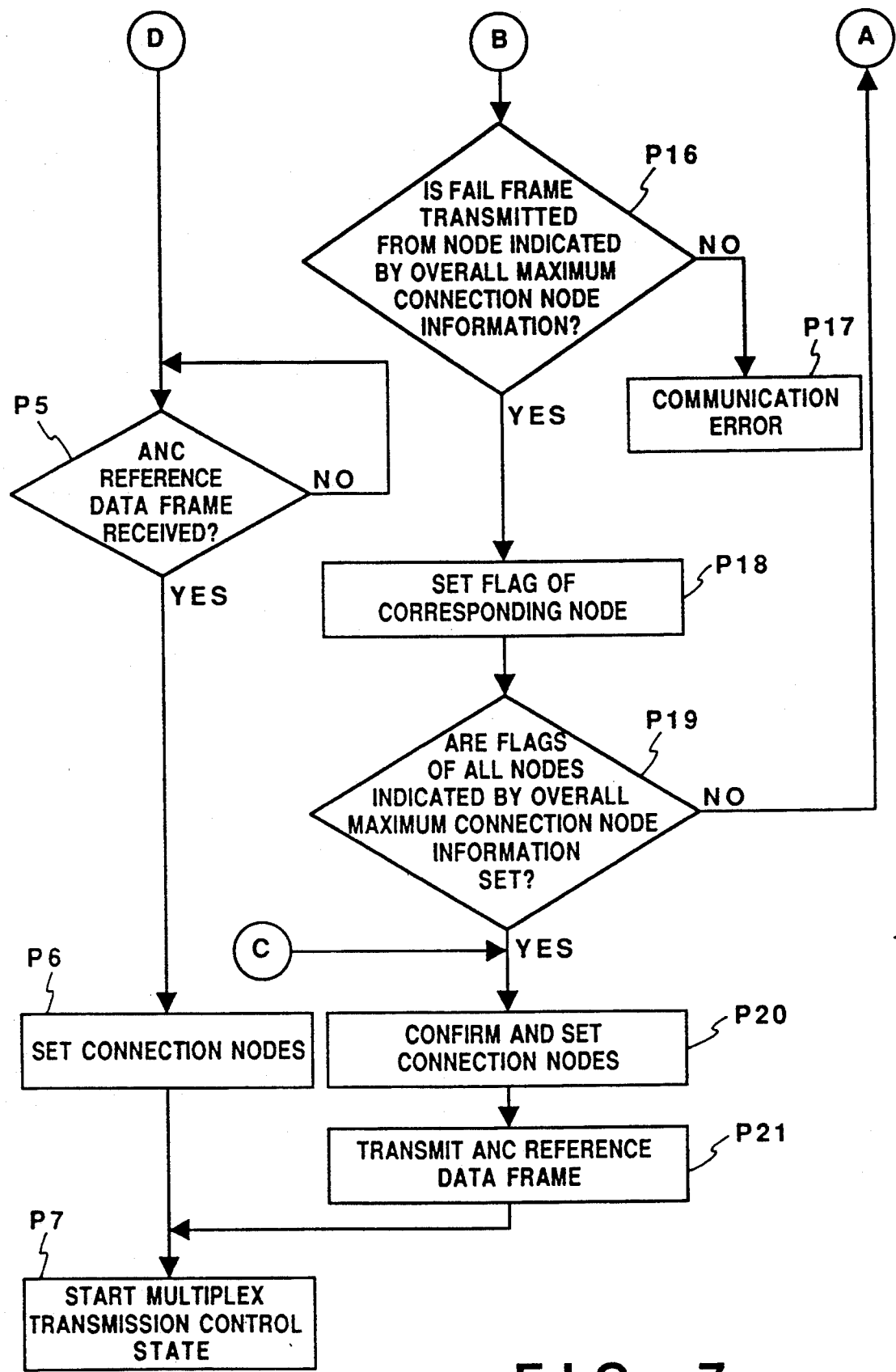

A confirmation procedure of connection nodes in the body-system node will be explained below with reference to FIGS. 6 and 7. In the embodiment to be described below, the body system node has the above-mentioned overall maximum connection node information although it does not have destination country information, i.e., grouped maximum connection node information. When the EGI node is in a down state, connection nodes are confirmed using the overall maximum connection node information and the predetermined time period $t_1$.

The body-system node performs different processing operations depending on whether the EGI node is normal or in a down state. More specifically, the IG-ON state is detected in step P1, a CPU initial check operation of the body-system node is performed in step P2, and it is checked in step P3 if the fail frame transmission request frame is received from the EGI node. If YES in step P3, this means that the EGI node is normal. In this case, a fail frame is transmitted in step P4, and the ANC reference data frame is received from the EGI node in step P5 in FIG. 7. In step P6, the body-system node sets the connection nodes on the basis of the ANC reference data frame, and starts a multiplex transmission control state in step P7.

On the other hand, if it is determined in step P3 that the fail frame transmission request frame is not received from the EGI node, it is checked in step P8 if an alter L signal goes to Hi (high) level. If NO in step P8, the flow returns to step P3; otherwise, the timer (t) is reset to zero to start counting of t in step P9. It is checked in step P10 if t is equal to or larger than $t_2$. If NO in step P10, the flow returns to step P3 again.

If no fail frame transmission request frame is received from the EGI node, the alter L signal goes to Hi level, and the predetermined time period $t_2$ elapses from then, it is determined that the EGI node is in a down state. The body-system node transmits a fail frame transmission request frame instead in step P11, resets the timer (t) to zero in step P12, and starts counting of t in step P13.

It is checked in step P14 if t is less than $t_1$. If NO in step P14, it is checked in step P15 if a fail frame is received from another node. If NO in step P15, the flow returns to step P13; otherwise, it is checked in step P16 in FIG. 7 if the received fail frame coincides with one of the nodes indicated by the overall maximum connection node information. If NO in step P16, a communication error is determined in step P17; otherwise, a flag corresponding to the node is set in step P18. In step P19, it is checked if flags corresponding to all the nodes (excluding the body-system node and the EGI node) indicated by the overall maximum connection node information are set.

If NO in step P19, the flow returns to step P13 to repeat steps P13, P14, P15, P16, P18, and P19; otherwise, the flow advances to step P20. In step P20, it is confirmed that all the nodes corresponding to the flags, and the body-system node are connected, and a node connection state is set.

On the other hand, if the predetermined time period $t_1$ elapses before the flags of all the nodes are set, the flow advances from step P14 to step P20. In step P20, it is confirmed that the transmission source node of the fail frames received so far, and the body-system node are connected, and a node connection state is set. In step P21, the ANC reference data frame is transmitted, and the control then enters a multiplex transmission control state in step P7.

Figure 8:
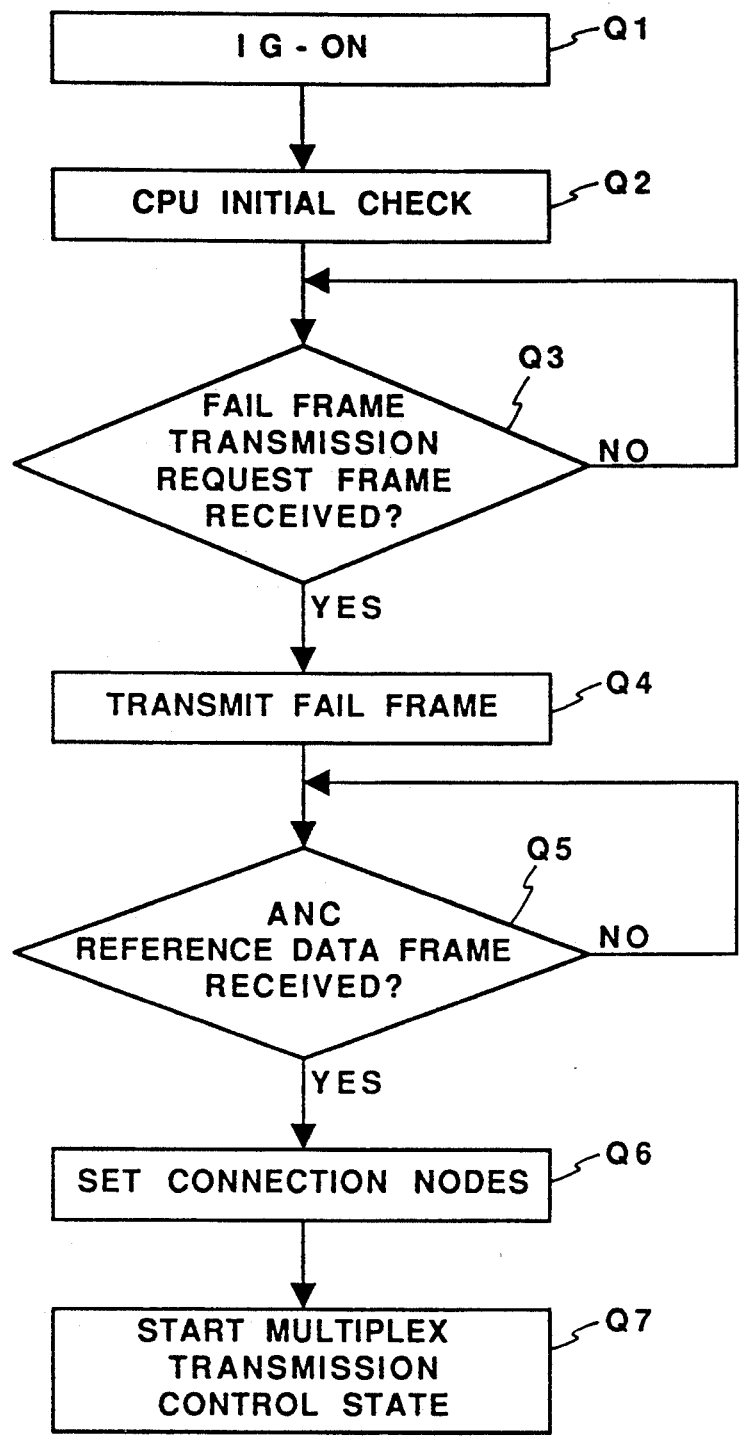
FIG. 8 is a flow chart showing a connection node confirmation procedure in other nodes.

FIG. 8 is a flow chart showing a connection node confirmation procedure in communication nodes other than the EGI node and the body-system node. In these nodes, the IG-ON state is detected in step Q1, a CPU initial check operation of the self node is performed in step Q2, and the control waits for reception of a fail frame transmission request frame from the EGI or body-system node in step Q3. If the frame is received, a fail frame is transmitted in response to the received frame in step Q4, and the control then waits for reception of the ANC reference data frame in step Q5. Upon reception of the frame, connection nodes are set based on the ANC reference data frame in step Q6, and the control then enters a multiplex transmission control state in step Q7.

In the above embodiment, the grouped maximum connection node information is stored in the EGI node, but may be stored in another node. In addition, grouping may be made in units of, e.g., types of vehicles in place of destination countries.

As many apparently widely different embodiments of the present invention can be made without departing from the spirit and scope thereof, it is to be understood that the invention is not limited to the specific embodiments thereof except as defined in the appended claims.

What is claimed is:

1. A multiplex transmission method in a multiplex transmission apparatus for performing time divisional distributed multiplex transmission operations among a plurality of communication nodes, comprising the steps of:
   (a) classifying a plurality of multiplex transmission apparatus into a plurality of groups;
   (b) storing information in a predetermined one of said plurality of communication nodes, wherein the information indicates all communication nodes which may be connected to each of said plurality of multiplex transmission apparatuses belonging to a given group classified in step (a);
   (c) causing said predetermined communication node to request communication nodes other than said predetermined communication node to transmit connection signals indicating that said communication nodes are connected to the multiplex transmission apparatus;
   (d) receiving the connection signals within a predetermined period of time after the request is issued; and
   (e) confirming the communication nodes which are actually connected to the multiplex transmission apparatus on the basis of the connection signals, wherein when the confirmation result obtained in step (e) indicates that all communication nodes which may be connected to the multiplex transmission apparatus belonging to the given group, are being connected, confirmation of connection of communication nodes is ended and multiplex transmission is started.

2. The method according to claim 1, wherein when a connection state of communication nodes, which may be connected to the multiplex transmission apparatus belonging to the given group, is confirmed based on the confirmation result in step (e), said predetermined communication node informs the connection state to said communication nodes other than said predetermined communication node.

3. The method according to claim 1, wherein if said predetermined communication node fails to request said communication nodes other than said predetermined communication node within a predetermined period of time to transmit the connection signals, it is determined that said predetermined communication node is in a communication disabled state, and another predetermined communication node of said plurality of communication nodes takes over to request transmission of the connection signals.

4. The method according to claim 3, wherein when both said predetermined communication node, and said another predetermined communication node of said plurality of communication nodes are in a communication disabled state, confirmation of communication nodes which may be connected to the multiplex transmission apparatus is not performed.

5. The method according to claim 1, wherein the classification of the plurality of multiplex transmission apparatuses is performed on the basis of function of each of said communication nodes which may be connected to said plurality of multiplex transmission apparatuses.

6. The method according to claim 1, wherein each of said communication nodes independently performs confirmation of a connection state of the communication nodes after the multiplex transmission is started.

* * * * *

UNITED STATES PATENT AND TRADEMARK OFFICE
CERTIFICATE OF CORRECTION

PATENT NO. : 5,263,022
DATED : November 16, 1993
INVENTOR(S) : NOBUTOKI et al.

It is certified that error appears in the above-identified patent and that said Letters Patent is hereby corrected as shown below:

| | | |
|---|---|---|
| In the Abstract, | Line 1, | change "In a" to --A--; |
| | Line 4, | after "a", insert --predetermined node--; |
| | Lines 5 and 6, | delete "predetermined node among the plurality of communication nodes is started". |
| Col. 3, | line 56, | after node", insert --6--. |
| Col. 5, | line 6, | after "remains", delete --to be--. |

Signed and Sealed this

Twenty-sixth Day of July, 1994

Attest:

BRUCE LEHMAN

Attesting Officer     Commissioner of Patents and Trademarks